July 23, 1929.  E. K. BAKER  1,721,725
AUTOMOBILE WHEEL
Filed Nov. 22, 1922  4 Sheets-Sheet 1
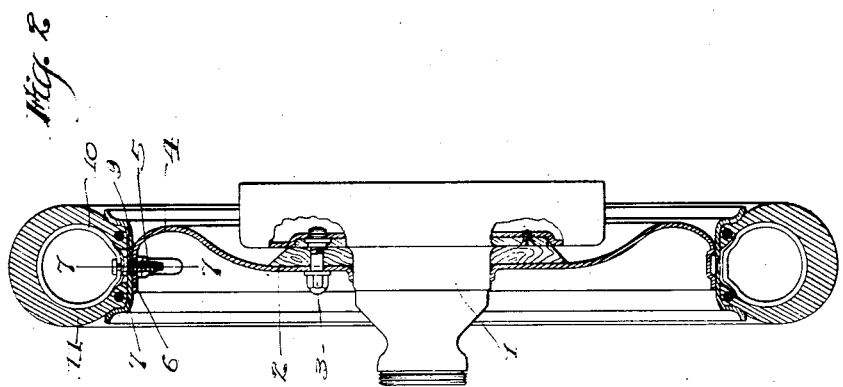
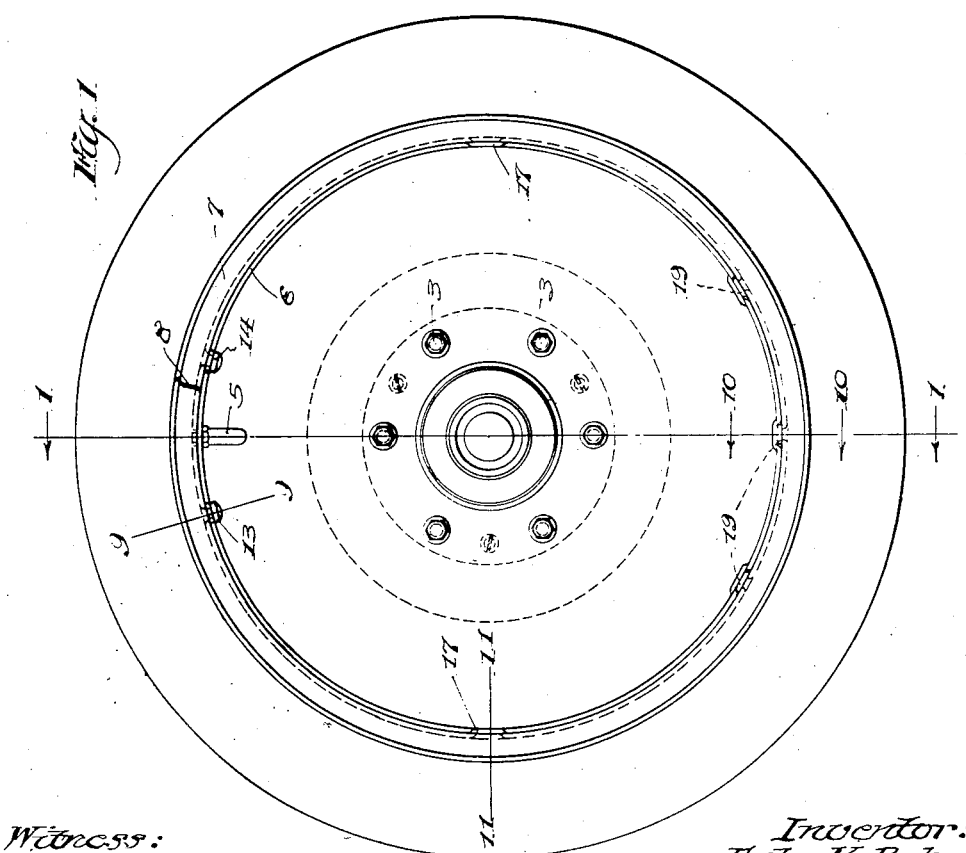

July 23, 1929.　　　　E. K. BAKER　　　　1,721,725
AUTOMOBILE WHEEL
Filed Nov. 22, 1922　　　4 Sheets-Sheet 2

Witness:
Earl Howe

Inventor:
Eric K. Baker
by Arthur W. Nelson Atty.

July 23, 1929.  E. K. BAKER  1,721,725
AUTOMOBILE WHEEL
Filed Nov. 22, 1922   4 Sheets-Sheet 3
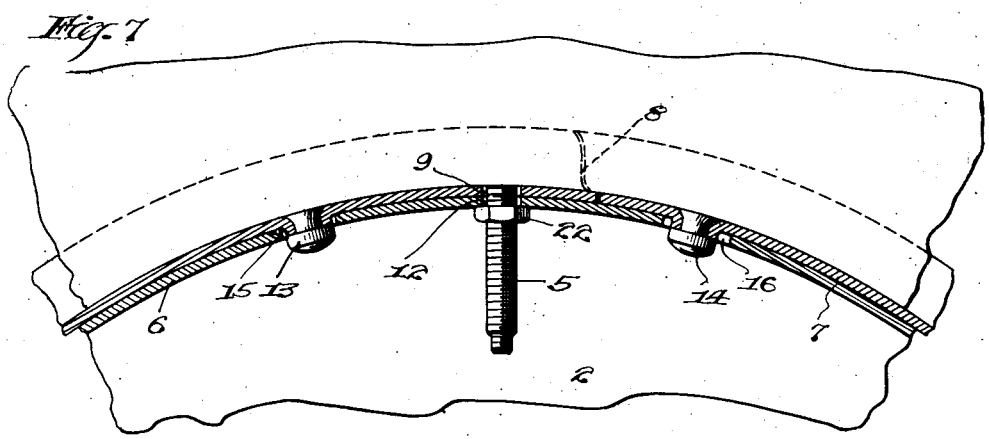
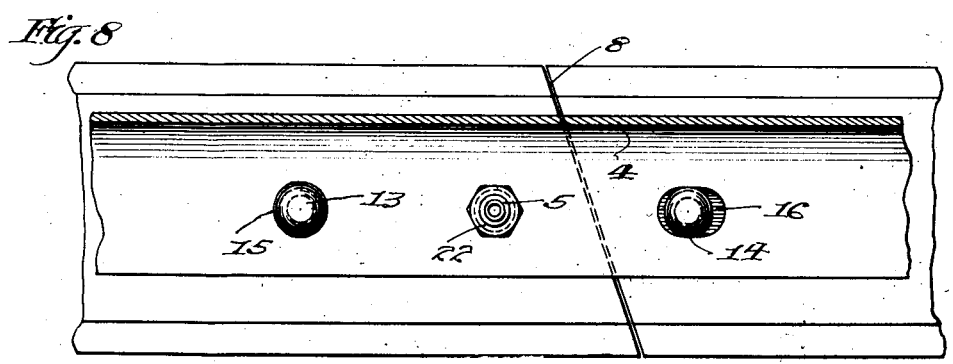
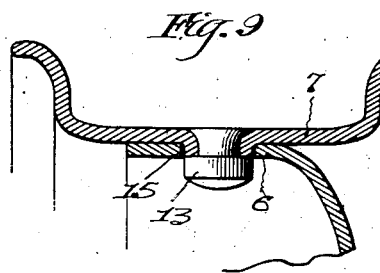 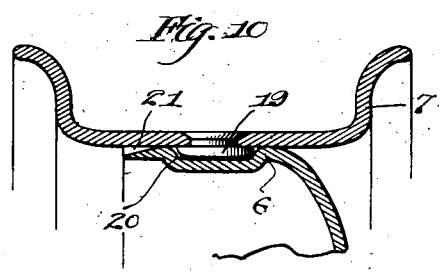
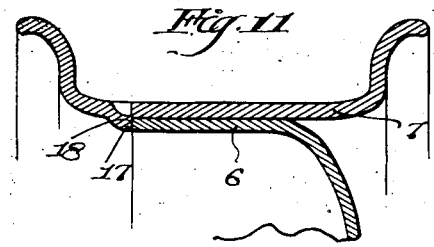 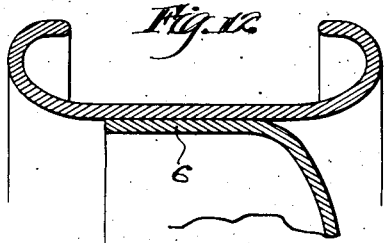

July 23, 1929.  E. K. BAKER  1,721,725
AUTOMOBILE WHEEL
Filed Nov. 22, 1922  4 Sheets-Sheet 4
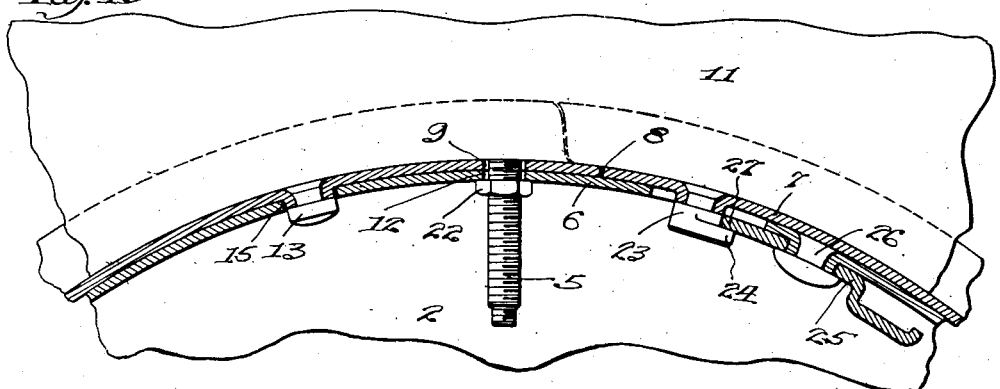
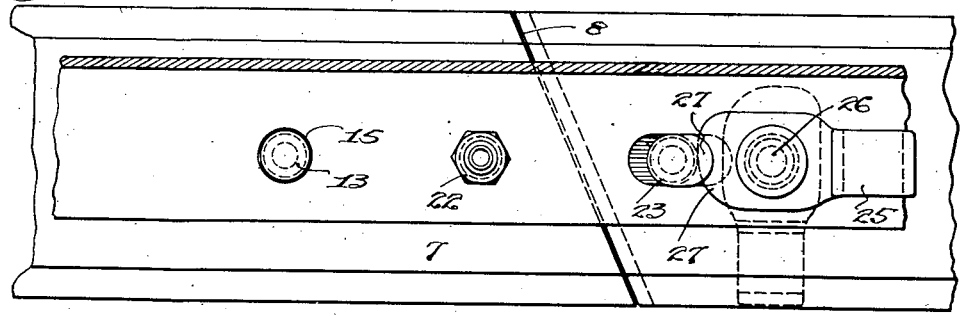
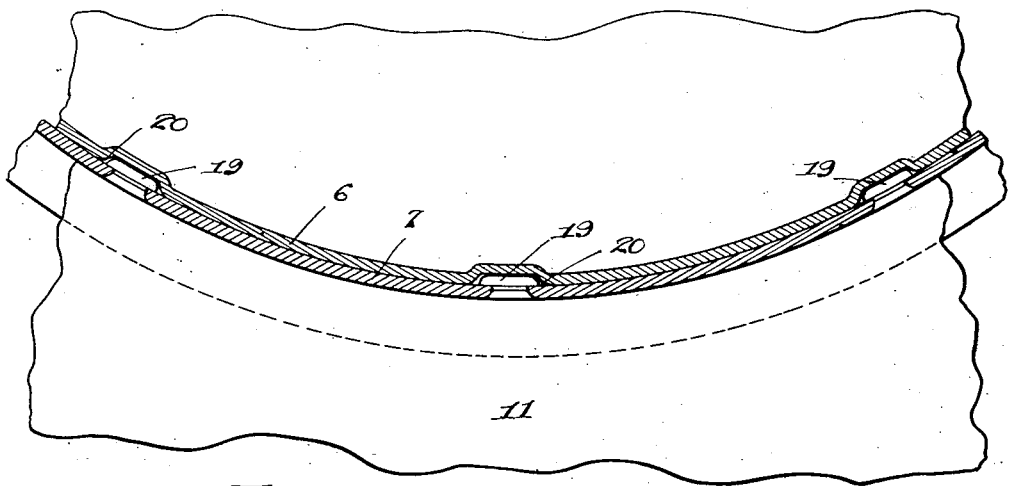

Patented July 23, 1929.

1,721,725

UNITED STATES PATENT OFFICE.

ERLE K. BAKER, OF DETROIT, MICHIGAN.

AUTOMOBILE WHEEL.

Application filed November 22, 1922. Serial No. 602,564.

My invention relates generally to improvements in automobile wheels, but relates more particularly to an automobile wheel construction designed to take a detachable tire carrying rim.

The general object of my invention is to simplify the construction and operation of such wheels and rims and to lessen the cost thereof.

Another object of my invention is to provide a construction by which the detachable rim shall be adapted to be buttoned on the wheel and still be firmly secured thereon with a minimum number of parts.

I aim also to provide a construction in which the air pressure of the tire can be utilized to assist in holding and locking the rim upon the wheel.

Another object of my invention is to lessen the weight of the wheel and detachable rim construction, particularly the parts carried upon the periphery of the wheel.

A special object of my invention is to improve the wheel and rim construction of the so-called demountable disc wheels.

My invention consists generally in a wheel and rim construction of the form, arrangement, construction and co-action of the parts whereby the above named objects, together with others that will appear hereinafter, are attainable; and my invention will be more readily understood by reference to the accompanying drawings which illustrate what I consider, at the present time, to be the preferred form thereof.

In said drawings:

Fig. 1 is a side elevation of a fully equipped vehicle wheel embodying my invention.

Fig. 2 is a sectional view substantially along the line 1—1 of Fig. 1.

Fig. 7 is a fragmentary longitudinal sectional view substantially along the line 7—7 of Fig. 2 but on an enlarged scale.

Fig. 8 is a bottom plan view of that part of the wheel and rim shown in Fig. 7.

Fig. 9 is a transverse sectional view substantially on the line 9—9 of Fig. 1 but on an enlarged scale.

Fig. 10 is a transverse sectional view substantially on the line 10—10 of Fig. 1 but on an enlarged scale.

Fig. 11 is a transverse sectional view substantially on the line 11—11 of Fig. 1 but on an enlarged scale.

Fig. 12 is similar to Fig. 11 showing the clincher type rim instead of the straight side.

Fig. 13 is a view similar to Fig. 7 but showing a modified form of my invention.

Fig. 14 is a bottom plan view of that portion of the wheel and rim shown in Fig. 13; and Fig. 15 is a central longitudinal view diametrically opposite from the valve stem of that construction shown in Figs. 13 and 14, showing the buttons for holding the rim in place.

Figure 3:
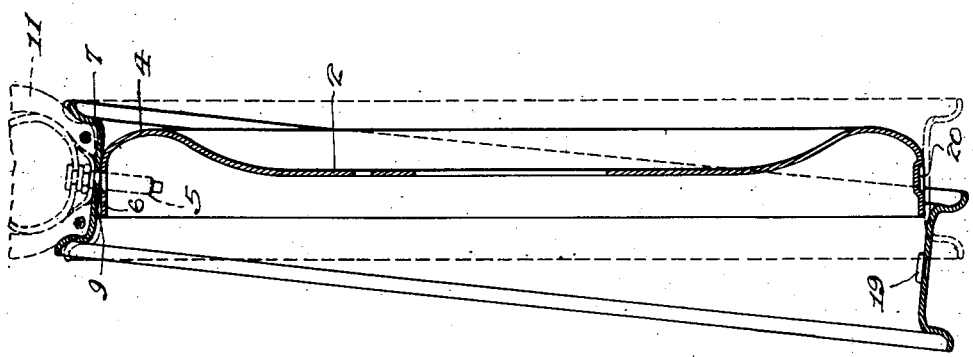
Fig. 3 is a sectional view through the wheel and rim, illustrating the operation of buttoning the tire on or off the wheel.

Referring now particularly to Figs. 1, 2 and 3, the reference character 1, represents the wheel hub upon which there is mounted a disc wheel 2. The disc wheel 2 is secured in place by means of a plurality of bolts 3 by the removal of which the disc wheel can be removed from the hub. Toward the periphery the disc 2 curves inwardly, as indicated at 4, thus accommodating the valve stem 5 so that inflation can be attended to from the outerside of the wheel. The extreme outer portion terminates in an annular substantially flat band-like portion 6 which forms a seat for the detachable tire carrying rim 7. The rim 7, as shown in Figs. 1, 2 and 3 is of the straight side type and is transversely split at one point 8. Fig. 12 illustrates the adaptability of the invention to clincher type rims as well. Spaced slightly to one side of the split 8 is a hole 9 to accommodate the valve stem 5 of the inner tube 10. The tire casing bears the reference character 11 and since the tube and casing are or may be of usual construction no further description thereof is needed.

The outer portion 6 of the disc wheel is provided with a hole 12 adapted for alignment with the hole 9 of the tire rim so that the valve stem may project inwardly as shown. Spaced preferably equidistant from the valve stem hole 9 will be found lugs or projections 13 and 14 which enter holes 15 and 16, respectively, formed in the portion 6 of the disc wheel to accommodate them. As will be observed by reference to Figs. 7 and 8, the lug 13 fits substantially snug in the hole 15 while the hole 16 is elongated longitudinally of the rim so that the lug 14 is capable of a limited movement in one direction therein.

At one or more places around the rim it is provided with an inwardly extending projection 17 (see Fig. 11) adapted to engage the edge portion 18 of the disc wheel and form a stop shoulder, whereby the rim can be centered transversely of the wheel.

As here shown, there is also provided diametrically opposite the valve stem and somewhat to each side thereof, as well, a plurality of button-like projections 19 adapted to enter recesses 20 formed in the portion 6 of the disc wheel. In order to enable the projections 19 to enter the recesses 20 more readily the disc portion 6 is cut away to provide the inclined entrant portion 21, best shown in Fig. 10.

Having thus described the structural characteristics of one form of my invention I will describe the operation thereof before passing to the other forms of my invention.

In practice it is customary to carry one or more spare wheels so that in the event of a puncture on the road the wheel is demounted at the hub by the removal of the bolts 3, and one of the spare wheels carrying the rim and inflated tire bolted to such hub. The work of changing the tire is usually done in the garage or other convenient place. Let us assume that the pneumatic tire is not on the rim and that the rim is detached from the wheel. The split ends of the rim are separated and the diameter of the same reduced so that the tire can be placed thereon in well known manner. The valve stem of the tire is then inserted through the hole 12 in the peripheral portion 6 of the wheel and the rim "buttoned" on as is well shown in Fig. 3. Since there is but little air pressure in the tire at this time the ends of the rim can separate enough to permit the projections 19 to enter the recesses 20. It will be understood that at the same time the lugs or projections 13 and 14 enter the holes 15 and 16 and that the projections 17 abut the edge 18 of the wheel. The rim and tire are now mounted in a proper position truly perpendicular to the axis of the wheel.

The tire is then fully inflated whereupon the air pressure acts powerfully to lock the rim in place. The nut 22 on the valve stem also serves further to lock the parts in place. To detach the rim it is necessary to deflate the tire whereupon the course will be the reverse of that described with respect to the attachment thereof to the wheel.

It should be observed that in the form described there are no rim end connectors and that the construction is at once simple, light, durable and inexpensive. The attachment and detachment of the rim to and from the wheel can be accomplished quickly and with ease.

The many advantages of this construction will now be apparent to any one skilled in the art to which this appertains.

Figure 6:
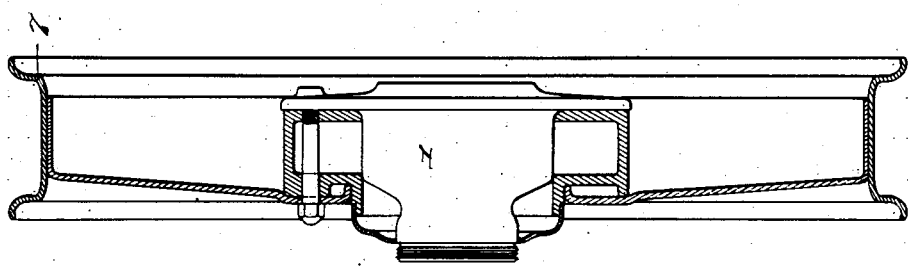
Figs. 4, 5 and 6 illustrate different types of disc wheels designed in accordance with my invention.
Figure 5:
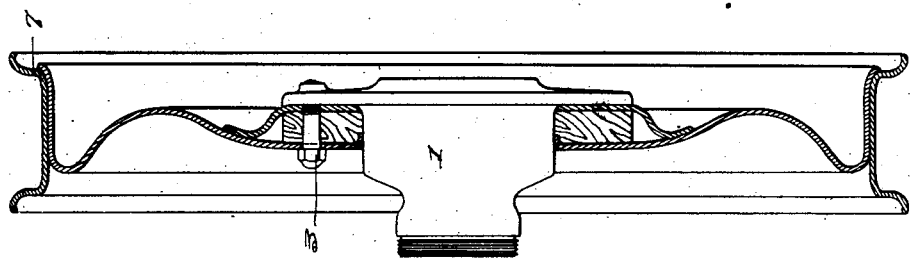
Figure 4:
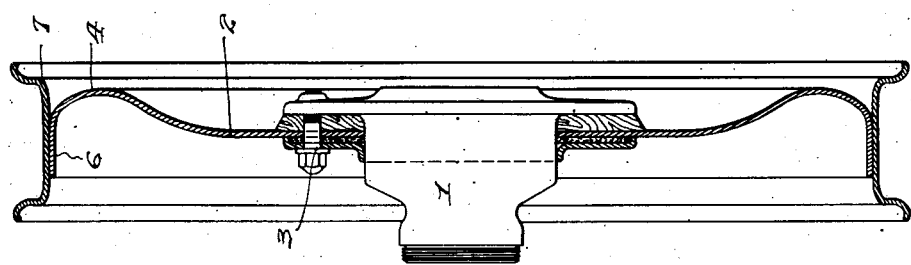

Referring now to Figs. 5 and 6 they illustrate different types of disc wheels to which my invention is as readily applicable. The body portion of the wheel of Fig. 5 is composed of two arcs whereas that of Fig. 6 is substantially conical.

In Figs. 13, 14 and 15 I have illustrated a slightly modified form of my invention wherein additional means are provided for locking the rim and wheel together. Therein similar parts have been given similar reference characters. The portion 7 is provided with a projection 23 instead of the projection 14 which projection is provided with a ledge-like extension 24. The portion 6 of the wheel is provided with a latch 25 which is pivoted at 26 to the peripheral portion 6 of the wheel. The end portion 27 of the latch is adapted to swing under the extension 24 and thus positively prevent separation of the rim and wheel even when the tire is deflated.

I claim:—

A wheel comprising a disk body having a peripheral flange, a tire supporting rim mounted on the flange of said disk body, and means between said body flange and rim preventing circumferential shifting of the rim on the flange, said rim being split so that it may be sprung on said body flange and cause said means to become effective as a connection between said rim and body flange.

In testimony whereof, I have hereunto set my hand, this 6th day of November, 1922.

ERLE K. BAKER.